(12) United States Patent
Bellussi et al.

(10) Patent No.: US 9,765,266 B2
(45) Date of Patent: Sep. 19, 2017

(54) CATALYTIC SYSTEM AND PROCESS FOR THE HYDROCONVERSION OF HEAVY OIL PRODUCTS

(75) Inventors: Giuseppe Bellussi, Piacenza (IT); Giacomo Rispoli, Rome (IT); Angela Carati, San Giuliano Milanese (IT)

(73) Assignee: ENI S.p.A., Rome (IT)

( * ) Notice: Subject to any disclaimer, the term of this patent is extended or adjusted under 35 U.S.C. 154(b) by 95 days.

(21) Appl. No.: 12/996,782

(22) PCT Filed: Jun. 8, 2009

(86) PCT No.: PCT/EP2009/004193
§ 371 (c)(1),
(2), (4) Date: Mar. 2, 2011

(87) PCT Pub. No.: WO2009/149923
PCT Pub. Date: Dec. 17, 2009

(65) Prior Publication Data
US 2011/0139677 A1 Jun. 16, 2011

(30) Foreign Application Priority Data
Jun. 11, 2008 (IT) .............................. MI2008A1061

(51) Int. Cl.
| | | |
|---|---|---|
| *C10G 45/04* | (2006.01) |
| *B01J 29/04* | (2006.01) |
| *B01J 23/16* | (2006.01) |
| *C10G 47/02* | (2006.01) |
| *C10G 47/26* | (2006.01) |
| *B01J 23/882* | (2006.01) |
| *B01J 23/883* | (2006.01) |
| *B01J 27/051* | (2006.01) |
| *B01J 29/06* | (2006.01) |
| *B01J 29/072* | (2006.01) |
| *B01J 29/16* | (2006.01) |
| *B01J 29/70* | (2006.01) |
| *B01J 29/76* | (2006.01) |
| *B01J 35/00* | (2006.01) |
| *B01J 37/20* | (2006.01) |
| *C10G 45/08* | (2006.01) |
| *C10G 45/12* | (2006.01) |
| *C10G 45/46* | (2006.01) |
| *C10G 45/50* | (2006.01) |
| *C10G 45/54* | (2006.01) |
| *C10G 47/20* | (2006.01) |

(52) U.S. Cl.
CPC ............ *C10G 45/04* (2013.01); *B01J 23/882* (2013.01); *B01J 23/883* (2013.01); *B01J 27/051* (2013.01); *B01J 29/041* (2013.01); *B01J 29/061* (2013.01); *B01J 29/072* (2013.01); *B01J 29/166* (2013.01); *B01J 29/7007* (2013.01); *B01J 29/7615* (2013.01); *B01J 35/0006* (2013.01); *B01J 37/20* (2013.01); *C10G 45/08* (2013.01); *C10G 45/12* (2013.01); *C10G 45/46* (2013.01); *C10G 45/50* (2013.01); *C10G 45/54* (2013.01); *C10G 47/20* (2013.01); *C10G 2300/1003* (2013.01); *C10G 2300/1011* (2013.01); *C10G 2300/1033* (2013.01); *C10G 2300/1074* (2013.01); *Y02P 30/20* (2015.11)

(58) Field of Classification Search
CPC ...... B01J 23/882; B01J 23/883; B01J 27/051; B01J 29/041; B01J 29/061; B01J 29/072; B01J 29/166; B01J 29/7007; B01J 29/7615; B01J 35/0006; B01J 37/20; C10G 2300/1003; C10G 2300/1011; C10G 2300/01
USPC .............. 208/108, 111.3, 111.35; 502/60, 79
See application file for complete search history.

(56) References Cited

U.S. PATENT DOCUMENTS

| | | | |
|---|---|---|---|
| 5,378,352 A | 1/1995 | Degnan et al. | |
| 5,871,635 A * | 2/1999 | Gupta et al. | ..................... 208/89 |
| 2002/0112987 A1* | 8/2002 | Hou et al. | ..................... 208/108 |
| 2010/0213103 A1 | 8/2010 | Patron et al. | |

(Continued)

FOREIGN PATENT DOCUMENTS

| | | |
|---|---|---|
| EP | 0 543 529 | 5/1993 |
| EP | 1 637 224 | 3/2006 |
| EP | 1 762 606 | 3/2007 |

OTHER PUBLICATIONS

Tian, K.P., et al., Catalytic Upgrading of Petroleum Residual Oil by Hydrotreating Catalysts: A Comparison Between Dispersed and Supported Catalysts, Fuel, 1998, vol. 77, No. 11, pp. 1221-1227.*

(Continued)

*Primary Examiner* — Renee Robinson
*Assistant Examiner* — Derek Muller
(74) *Attorney, Agent, or Firm* — Oblon, McClelland, Maier & Neustadt, L.L.P.

(57) ABSTRACT

Catalytic system which can be used in processes for the hydroconversion of heavy oils by means of hydrotreatment in slurry phase, characterized in that it comprises: a catalyst, having the function of hydrogenating agent, containing $MoS_2$ or $WS_2$ or mixtures thereof in lamellar form or an oil-soluble precursor thereof; a co-catalyst, having nanometric or micronic particle-sizes, selected from cracking and/or denitrogenation catalysts. The co-catalyst preferably consists of zeolites having small-sized crystals and with a low aggregation degree between the primary particles, and/or oxides or sulfides or precursors of sulfides of Ni and/or Co in a mixture with Mo and/or W.

12 Claims, No Drawings

(56) References Cited

U.S. PATENT DOCUMENTS

2011/0005976 A1 1/2011 Rispoli et al.

OTHER PUBLICATIONS

Shi, B., et al, Hydrocracking of LaioHe Vacuum Residue with Oil-Soluble Co—Ni Bimetallic Catalysts and Hydrogen Donor, Prepr.Pap.-Am. Chem. Soc., Div. Fuel Chem., 2003, 48(2), pp. 722-724.*

Baumgarten, et al., Investigation of Molybdenum Disulfide and Tungsten Disulfide, Technical Memorandum No. MERL-2011-37, 2011, U.S. Department of the Interior, pp. 1-14.*

International Search Report issued Aug. 26, 2009 in PCT/EP09/04193 filed Jun. 8, 2009.

* cited by examiner

CATALYTIC SYSTEM AND PROCESS FOR THE HYDROCONVERSION OF HEAVY OIL PRODUCTS

The present invention relates to a catalytic system and the process for the hydroconversion of heavy oil products in which it can be used.

The conversion of heavy hydrocarbon feedstocks to distillates is a complex process which involves the reduction of the molecular weight of the constituents of the feedstock and an increase in the H/C ratio which can be obtained by the removal of carbon (C-rejection processes) or addition of hydrogen (H-addition processes). Thermal processes generally have a poor selectivity towards the production of distillates as, due to the fact that it is necessary to operate at high temperatures, they produce high quantities of gases, in addition of course to coke or tar.

In hydrogenation processes, the conversion of the feedstock to distillates is obtained through the combined action of cracking and catalytic hydrogenation reactions of the reactive fragments. In this way, it is possible to effectively control the propagation of radical reactions above all with respect to the condensation of aromatic products, thus reducing the problem of the formation of coke. The introduction of hydrogen in the system also allows the aromatic structures to be saturated and the heteroatoms to be removed, thus obtaining a high quality of distillates.

The use of supported catalysts in hydroconversion processes of residues and heavy crude oils with fixed/ebullated bed reactors, has a wide case study. These are generally bifunctional systems consisting of alumina as ligand and two active phases, one responsible for the cracking activity and which can be introduced by acting on the composition of the ligand ($SiO_2$—$Al_2O_3$) or with the addition of a second material having acid sites (Clay or zeolite) and one responsible for the hydrogen transfer activity, obtained by functionalization of the carrier with a suitable mixture of Mo (W)/Co (Ni) sulfides.

Cracking reactions promoted by the acid sites of zeolites, on the other hand, also increase the formation rate of coke which, together with the high content of metals, asphaltenes and heteroatoms (sulfur, nitrogen, etc.), inevitably leads to a rapid deactivation of the catalyst.

In this respect, the use of catalysts in slurry phase, less subject to deactivation phenomena, can represent the most suitable solution for the hydrotreatment of heavy oil charges.

The use of dispersed catalysts based on sulfides of metals of group V, VI and VIII (in particular Fe, Mo and V), introduced into the feedstock for the upgrading of residues, heavy oils and bitumens in the form of oil-soluble precursors (U.S. Pat. No. 5,288,681) or preformed ex-situ (U.S. Pat. No. 4,303,634), is known and widely described by scientific and patent literature.

The industrial application of these technologies, however, has so far been conditioned by the necessity of improving the catalytic performances and optimizing the life cycle of the catalyst, due to the high impact on the economics of the process.

Over the years, numerous variants have been experimented and proposed with respect to both the use of various kinds of precursors and the ex-situ synthesis of the catalyst in order to improve its specific activity.

In most cases, the catalytic systems proposed consist of sulfides of one or more metals, capable of promoting the hydrogenation/upgrading reactions, whereas the cracking phenomena are technically promoted, and are inevitably linked to the selection of operative conditions.

The use of bifunctional systems in slurry phase, with the contemporaneous presence of hydrogenating and cracking functions, could combine the advantages of catalysts for fixed or ebullated beds with those typical of slurry processes, catalytically promoting both hydrogenation and cracking reactions, maximizing the catalytic activity and opposing deactivation.

There are few examples in this sense in patent literature:
WO02059235 (EXXON) Slurry process in two steps with dispersed catalysts deriving from oil-soluble precursors in the first step and Co—Mo, Co—Ni—Mo supported on $Al_2O_3$ in the second step, wherein the carrier can be combined with US-Y or acid micro-carriers. The first step once-through, the second step with recycling.
U.S. Pat. No. 6,712,955 (EXXON) The preparation of a catalyst for a slurry hydrotreatment process of heavy feedstocks is described. The system consists of metals of group VI and VIII which can be supported on a system having a cracking function, consisting of zeolitic materials (ZSM-5, Y, X, ALPO, SAPO).
WO0233029 (TEXACO), a slurry process with recycling, for the upgrading of heavy oils with Co—Mo or Ni—Mo catalysts supported on $Al_2O_3$ which includes promoters such as zeolites, halogens, phosphides, oxides of alkaline earth metals.
U.S. Pat. No. 6,755,962 (CONOCO), a combination of thermal and catalytic cracking in a single slurry reactor in countercurrent. The reactor is divided into three areas, with liquid feeding from above in the vapour phase area, thermal cracking in the intermediate area in liquid phase, catalytic cracking in the lower area where the slurry catalyst is present, kept in suspension by the hydrogen fed from below. The non-converted liquid is recycled in the third area. A cracking catalyst is used, which can consist of Fe, Co, Ni or Mo on zeolite.

The heterogeneous catalysts used in fixed or ebullated bed technologies generally consist of alumina as ligand and two active phases, one responsible for the cracking activity and which can be introduced by acting on the composition of the ligand ($SiO_2$—$Al_2O_3$) or with the addition of a second material having acid sites (Clay or zeolite) and one responsible for the hydrogen transfer activity, obtained by functionalization of the carrier with a suitable mixture of sulfides of Mo (W)/Co (Ni). These systems exert an effective hydrocracking activity, revealing however a poor capacity of activating the molecular hydrogen and blocking the free radicals and the formation of pitchy products which can cause a rapid deterioration of the catalyst or blocking of plant sections. This limitation has significant negative consequences: it does not allow the heavier reaction products to be recycled and greatly limits the possibility of increasing the concentration of solids (meaning coke and its precursors and transition metal sulfides) in the reaction medium. In ebullated bed processes, the maximum manageable hold-up of solids (determined with HFT: Hot Filtration Test) is lower than 0.2% and frequent maintenance interventions are necessary for removing the pitchy deposits formed in various sections of the plant.

The catalysts used in slurry processes generally consist of a nano-dispersion of laminar crystallites of molybdenite ($MoS_2$) having sub-micronic dimensions, generated in-situ in the reaction medium or ex-situ, by interaction of a suitable molybdenum compound with $H_2S$ or with an organic sulfide. This material is extremely effective in the activation of hydrogen and has optimum properties as radical scavenger thus limiting the formation of pitches or resins on the part of organic compounds with a low H/C ratio. Molybdenite, on the contrary, has a low cracking capacity and therefore in slurry processes, the cracking activity is essentially of a thermal nature and consequently strictly linked to the operating conditions, with significant repercussions on the yields for each single passage. It is also known that thermal processes are not very effective with respect to the removal of nitrogen.

The innovation element is represented by the contemporaneous use of two catalysts with complementary functions in a finely dispersed form, which together with the technology developed by the applicant in the field of slurry processes for the conversion of oil residues, overcomes the main limitations which have so far blocked the development of slurry processes on an industrial scale. With respect to the processes of the state of the art, which use fixed bed catalysts for hydrotreatment or a single catalyst in slurry phase with only hydrogenating properties, the addition of the second catalyst with acid properties, or in any case which favour cracking and HDN, allows an increase in the performances of the reaction system under the same operating conditions (increase in the conversion per passage, increase in the denitrogenation and desulfurization) or reduces the severity of the process with the same performances.

The use of the catalyst with an acid function in slurry phase (nanometric dimensions) allows its effectiveness to be increased with respect to processes in which the catalyst is used with traditional dimensions (millimetric dimensions).

The two catalysts used exert a synergic action in the reaction environment: the first provides a hydrogenating function which allows the demetallation of the feedstock, the elimination of the hetero-elements (S, N) and the reduction in the formation of coke and organic compounds with the tendency of poisoning acid catalysts by fouling, the second contains an active phase which essentially promotes the cracking and denitrogenation of the feedstock.

The catalytic system, object of the present invention, which can be used in the hydroconversion of heavy oils, is characterized in that it comprises:
- a catalyst, having a hydrogenating function, containing $MoS_2$ or $WS_2$ or mixtures thereof in lamellar form or an oil-soluble precursor of the same;
- a co-catalyst, containing an active phase which promotes in particular the cracking and/or denitrogenation of the feedstock, having particles with nanometric or micronic dimensions, selected from cracking and/or denitrogenation catalysts, preferably consisting of zeolites having small-sized crystals and with a low aggregation degree between the primary particles, and/or oxides or sulfides or precursors of Ni and/or Co sulfides, in a mixture with Mo and/or W, possibly supported.

The catalyst can also contain V, Ni and/or Fe sulfides.

The catalyst with a hydrogenating function can be formed in situ by the reaction of an oil-soluble precursor of Mo with the S of the feedstock, forming lamellae of $MoS_2$, highly dispersed, which, as the reaction proceeds, become enriched in the sulfides of transition metals coming from the feedstock.

Under regime conditions, the catalyst appears to be a complex system, consisting of $MoS_2$ dispersed in a carbonaceous matrix, containing crystalline domains of V, Ni and Fe sulfides.

The catalyst can be possibly supported on alumina, silica, silico-alumina, talc or micas.

The co-catalyst is protected from the hydrogenating action of the former and can typically maintain its activity for a longer period of time with respect to its use in the absence of the hydrogenation catalyst.

When the co-catalyst consists of zeolites, these are suitably dispersed in the reaction medium possibly contained in the co-catalyst: said zeolites are preferably selected from medium- or large-pore groups, such as Beta, Y, MCM-22, ZSM-12 and ZSM-5, ERS-10, ZSM-23; more preferably from Beta, Y and MCM-22.

Said co-catalyst can possibly also contain oxides or sulfides of Mo.

When the co-catalyst consists of oxides or sulfides or precursors of sulfides of Ni, Co, W and Mo, it can be optionally supported on solid particles with suitable characteristics for being effectively dispersed in the reaction medium, i.e. preferably with a low density, micronic or submicronic dimensions, low abrasiveness, preferably selected from aluminas, silicas, silico-aluminas, talc and micas.

The catalyst and co-catalyst are preferably in a weight ratio ranging from 100:1 to 1:20, more preferably from 75:1 to 1:10.

They can be possibly present on the same particle of the catalytic system formed, i.e. the whole catalytic system consisting of catalyst and co-catalyst can be supported on the same carrier particles.

A further object of the present invention relates to a hydroconversion process of heavy oils, aimed at their denitrogenation and desulfurization, which comprises sending the heavy oil to a hydrotreatment step in slurry phase characterized in that it uses the catalytic system described above.

In the process according to the invention, downstream of the hydrotreatment step, a separation of the effluent stream from said step is preferably effected, in which the heavier liquid fraction separated containing the dispersed catalyst and co-catalyst is recycled to the hydrotreatment step.

The heavy oils to be treated are preferably selected from crude oils, heavy crude oils, bitumens from tar sands, distillation residues, heavy distillation cuts, deasphalted distillation residues, vegetable oils, oils deriving from coal and oil shales, oils obtained from the thermo-decomposition of waste products, polymers, biomasses, distillates such as VGO or heavy gas oils.

The concentration of the hydrogenation catalyst dispersed in the feedstock, comprising the recycled stream, fed to the hydrotreatment step, defined on the basis of the concentration of the metal or metals present, preferably ranges from 100 to 30,000 ppm.

The hydrotreatment step is preferably effected at temperatures ranging from 350 to 480° C. and pressures ranging from 800 to 220 atmospheres.

The process comprises the conversion of the feedstock to the slurry reactor(s) in a reaction section, the separation of the liquid products (naphtha, AGO, VGO) and gaseous products (fuel gas and LPG) in a separation section and fractionation and finally recycling of the non-converted fraction of the feedstock to the reactor. The catalysts are not confined in the reactor but follow the flow of the heavy liquid stream as dispersed solids in the system. In this way, both the catalyst and co-catalyst are recycled to the reactor with the non-converted stream.

A purging from the reaction cycle can be envisaged to stabilize the development of the content of metals and organic solids in the plant. A make-up of the two catalytic materials is included to maintain their concentration constant.

The catalyst-co-catalyst system can also be applied for the upgrading of distillates such as gas oil and vacuum gas oil.

The following examples are provided for a better understanding of the invention, without limiting the invention in any way.

EXAMPLE 1

Upgrading of RV Ural in a Stirred Micro-autoclave

The test, which should be considered as a reference base case, was carried out using Mo as catalyst (introduced as oil-soluble precursor together with the feedstock).

A Ural vacuum residue is used as feedstock, whose main characteristics are indicated in Table I below:

TABLE I

Main properties of the RV URAL feedstock

| | |
|---|---|
| Density at 15° C. (g/cm$^3$) | 1.0043 |
| °API | 9.4 |
| Viscosity 100° C. (cSt) | 1277 |
| CCR (wt %) | 18.9 |
| C (wt %) | 86.0 |
| H (wt %) | 10.2 |
| H/C (mol/mol) | 1.4 |
| N (wt %) | 0.57 |
| S (wt %) | 2.60 |
| Ni (ppm) | 84 |
| V (ppm) | 262 |
| Fe (ppm) | 48 |
| Mo (ppm) | Absent |
| ASF C5 (%) | 16.0 |
| IBP-170° C. (%) | 0 |
| 170-350° C. (%) | 0 |
| 350-500° C. (%) | 6.5 |
| 500-FBP (%) | 93.5 |

The operating conditions used for the upgrading are:

| | |
|---|---|
| Treated feedstock | 10 g |
| Mo concentration | 6000 wppm |
| Pressure | 160 bar |
| Reaction temperature | 420° C. |
| Reaction time | 4 h |

The yield to products, conversion and HDN/HDS performances are indicated hereunder:

| $H_2S$ wt % | gas $C_1$-$C_4$ wt % | NAP wt % | AGO wt % | VGO wt % | DAO C5 500+ wt % | ASF C5 wt % | Conv ASF C5 | Conv. 500+ | HDN | HDS |
|---|---|---|---|---|---|---|---|---|---|---|
| 0.8 | 2.4 | 6.6 | 25.4 | 27.6 | 30.6 | 4.3 | 73 | 62 | 33 | 72 |

EXAMPLE 2

Upgrading of RV Ural in a Stirred Micro-autoclave

The test was carried out on RV Ural, using Mo as catalyst (introduced as oil-soluble precursor together with the feedstock) and Beta zeolite as co-catalyst (pre-calcined at 500® C. and introduced as powder together with the Mo), operating under the same operative conditions as test 1. The average particle-size of Beta zeolite is 10 µm.

| | |
|---|---|
| Treated feedstock | 10 g |
| Mo concentration | 6000 wppm |
| Co-catalyst concentration | 4% wt |
| Pressure | 160 bar |
| Reaction temperature | 420° C. |
| Reaction time | 4 h |

The yield to products, conversion and HDN/HDS performances are indicated hereunder:

| $H_2S$ wt % | gas $C_1$-$C_4$ wt % | NAP wt % | AGO wt % | VGO wt % | DAO C5 500+ wt % | ASF C5 wt % | Conv ASF C5 | Conv. 500+ | HDN | HDS |
|---|---|---|---|---|---|---|---|---|---|---|
| 1.0 | 3.4 | 6.3 | 26.5 | 26.9 | 30.1 | 3.8 | 76 | 63 | 42 | 72 |

An increase is observed in the HDN performances and for the conversion of the asphaltenes.

EXAMPLE 3

Upgrading of RV Ural in a Stirred Batch Micro-autoclave

The test was carried out on RV Ural, under the same operative conditions as test 1, using MCM-22 zeolite as co-catalyst. The average particle-size of MCM-22 zeolite is 10 μm.

The yield to products, conversion and HDN/HDS performances are indicated hereunder:

| $H_2S$ wt % | gas $C_1$-$C_4$ wt % | NAP wt % | AGO wt % | VGO wt % | DAO C5 500+ wt % | ASF C5 wt % | Conv ASF C5 | Conv. 500+ | HDN | HDS |
|---|---|---|---|---|---|---|---|---|---|---|
| 1.0 | 3.3 | 6.9 | 25.2 | 26.7 | 30.9 | 3.7 | 77 | 63 | 43 | 72 |

The results obtained show in all cases a similar distribution of the products and HDS activity, whereas, as far as the HDN activity and asphaltene conversion are concerned, increased performances were observed for the tests carried out in the presence of co-catalyst.

EXAMPLE 4

Upgrading of VB-tar in a Pilot Plant

The test was carried out in a pilot unit with a slurry reactor in continuous, operating according to the typical scheme with recycling of the non-converted heavy fraction containing the catalyst, using Mo (introduced as oil-soluble precursor together with the feedstock) and Beta zeolite as co-catalyst (pre-calcined at 500° C. and introduced as a dispersion in a suitable hydrocarbon matrix). The average particle-size of Beta zeolite is 10 μm.

A visbreaking tar was used as feedstock, whose main characteristics are indicated in Table II below:

TABLE II

| Main properties of the VB-tar feedstock | |
|---|---|
| Density at 15° C. (g/cm³) | 1.056 |
| Viscosity 140° C. (cSt) | 146.1 |
| CCR (wt %) | 32.5 |
| C (wt %) | 85.4 |
| H (wt %) | 8.8 |
| H/C (mol/mol) | 1.24 |
| N (wt %) | 0.5 |
| S (wt %) | 5.8 |
| Ni (ppm) | 77.7 |
| V (ppm) | 209 |
| Fe (ppm) | 31 |
| Mo (ppm) | 11.5 |
| ASF C5 (%) | 20 |
| THFI (%) | 0.2 |
| IP-170° C. (%) | — |
| 170-350° C. (%) | — |
| 350-500° C. (%) | 9.8 |
| 500-FBP (%) | 70.0 |

The operative conditions used for the test are:

| Treated feedstock | 2500 g/h |
|---|---|
| Mo concentration | 6000 wppm |
| Co-catalyst concentration | 4% wt |
| Pressure | 144 bar |
| Reaction temperature | 420° C. |

An evaluation of the performances of the plant under stationary conditions, in the presence of the co-catalyst, was effected over a useful period of 10 hours, comparing the quality and distribution of the yields of SCO (Synthetic Crude Oil) obtained with the data obtained under comparable running conditions.

| Mo ppmw | Beta zeolite wt % | $H_2S$ | gas C1-C4 | NAP | AGO | VGO | DAO C5 500+ | ASF C5 | Conv 500+ % | Conv ASF C5 % | HDS % | HDN % |
|---|---|---|---|---|---|---|---|---|---|---|---|---|
| 3000 | 0 | 4.5 | 10.1 | 5.3 | 31.3 | 36.3 | 6.1 | 0.1 | 92.3 | 99.5 | 79 | 32 |
| 10000 | 0 | 5.8 | 10.2 | 5.2 | 35.7 | 35.7 | 3.5 | 0.1 | 95.7 | 99.5 | 90 | 51 |
| 4600 | 4 | 5.8 | 9.2 | 6.8 | 39.1 | 33.2 | 2.9 | 0.1 | 96.5 | 99.8 | 91 | 64 |

As far as the product distribution is concerned, a tendency is observed towards a lightening of the system, with an increase in the AGO content to the detriment of the heavier fractions. The quality of the product also appears to have positive effects, showing a significant reduction in the S and N contents, comparable to the results obtained when operating in the presence of higher concentrations of Mo (12,000 wppm).

EXAMPLE 5

Upgrading of RV Ural in a Stirred Batch Micro-autoclave with a Catalyst Based on Ni/Mo The test was carried out on RV Ural, using Mo as catalyst (introduced as oil-soluble precursor together with the feedstock) and a hydroconversion catalyst based on Ni—Mo (15% wt of Mo and 5% wt of Ni) supported on alumina as co-catalyst, operating under the same operative conditions as test 1. The average particle-size of the co-catalyst is 30 μm.

The operative conditions used are:

| | |
|---|---|
| Treated feedstock | 10 g |
| Mo concentration | 6000 wppm |
| Co-catalyst concentration | 4% wt |
| Pressure | 160 bar |
| Reaction temperature | 420° C. |
| Reaction time | 4 h |

The yield to products, conversion and HDN/HDS performances are indicated below:

| $H_2S$ wt % | gas $C_1$-$C_4$ wt % | NAP wt % | AGO wt % | VGO wt % | DAO C5 500+ wt % | ASF C5 wt % | Conv ASF C5 | Conv. 500+ | HDN | HDS |
|---|---|---|---|---|---|---|---|---|---|---|
| 0.8 | 2.4 | 6.3 | 26.3 | 27.2 | 30.5 | 3.5 | 78 | 64 | 40 | 81 |

The results obtained show a product distribution and conversion of the heavy fractions similar to the base case (example 1), whereas there is an improvement in the HDN and HDS performances and conversion of the heavy 500° C.+ fraction.

The invention claimed is:

1. A catalytic system, comprising:
   a catalyst, as a hydrogenating agent; and
   a nanometric or micronic co-catalyst, that is a cracking catalyst, a denitrogenation catalyst, or a combination thereof,
   wherein the catalytic system is suitable for hydroconversion of a heavy oil,
   wherein the catalyst consists of $MoS_2$, $WS_2$, or a mixture thereof, in lamellar form, or an oil-soluble precursor thereof,
   wherein the catalyst is not supported, and
   wherein the co-catalyst consists of zeolites having small-sized crystals and with a low aggregation degree between primary particles.

2. The catalytic system according to claim 1 wherein the zeolites comprise medium or large pores.

3. The catalytic system according to claim 2, wherein the zeolites are Beta, Y, or MCM-22.

4. The catalytic system according to claim 1, wherein the co-catalyst is supported on solid particles with micronic or submicronic dimensions.

5. The catalytic system according to claim 4, wherein the solid particles on which the co-catalyst is supported are alumina, silica, silico-alumina, talc, mica, or a combination thereof.

6. The catalytic system according to claim 1, wherein the catalyst and co-catalyst are in a weight ratio from 100:1 to 1:70.

7. The catalytic system according to claim 6, wherein the catalyst and co-catalyst are in a weight ratio from 75:1 to 1:50.

8. A process for hydroconversion of a heavy oil, the process comprising:
   sending the heavy oil to a hydrotreatment in slurry phase with a catalytic system as in claims 2-5, or 6,
   wherein the heavy oil is a crude oil, a heavy crude oil, a bitumen from a tar sand, a distillation residue, a heavy distillation cut, a deasphalted distillation residue, a vegetable oil, an oil deriving from coal or oil shale, an oil obtained by a process comprising thermo-decomposition of a waste product, a polymer, a biomass, a distillate, or a combination thereof.

9. The process according to claim 8, further comprising:
   separating an effluent stream from the hydrotreatment downstream of the hydrotreatment, thereby obtaining a heavier liquid fraction comprising dispersed catalyst and co-catalyst, and
   recycling the heavier liquid fraction to the hydrotreatment.

10. The process according to claim 9,
    wherein the sending comprises feeding hydrogenation catalyst dispersed in a feedstock, comprising the heavier liquid fraction of the recycling, to the hydrotreatment, and
    wherein a concentration of the hydrogenation catalyst, based on a concentration of a metal or metals, is from 100 to 30,000 ppm.

11. The process according to claim 8, wherein the hydrotreatment is at a temperature of from 350 to 480° C. and a pressure of from 80 to 220 atmospheres.

12. The process of claim 8, wherein sending the heavy oil to the hydrotreatment in slurry phase with the catalytic system comprises hydrogenating the heavy oil, demetallizing the heavy oil, and cracking and denitrogenation of the heavy oil.

* * * * *